United States Patent [19]

Kimura et al.

[11] Patent Number: 5,363,029
[45] Date of Patent: Nov. 8, 1994

[54] LASER-BEAM MACHINE USING TWO-DIMENSIONAL STEPPING MOTOR

[75] Inventors: Kaoru Kimura, Kitakyushu, Japan; Philip V. Monnin, Troy, Ohio

[73] Assignee: Kabushiki Kaisha Yaskawa Denki, Fukuoka, Japan

[21] Appl. No.: 49,191

[22] Filed: Apr. 19, 1993

[51] Int. Cl.$^5$ .............................................. H02P 8/00
[52] U.S. Cl. ...................................... 318/696; 318/568.11
[58] Field of Search ............... 318/696, 685, 687, 254, 318/138, 439, 567, 568.12, 658.2, 568.11, 572, 573, 577, 625, 53, 85, 112, 135; 250/202, 578.1, 234, 235-236, 560, 561; 356/376, 377, 380, 386, 387, 394, 398, 429, 431; 395/83, 84, 90-92, 95; 901/8-324; 364/474.08, 474.11, 474.35

[56] References Cited

U.S. PATENT DOCUMENTS

| | | | |
|---|---|---|---|
| 4,416,001 | 11/1983 | Ackerman et al. | 250/236 |
| 4,605,212 | 12/1977 | Belleson et al. | 3356/167 |
| 4,823,062 | 4/1989 | Hoffman et al. | 318/687 |
| 4,890,241 | 12/1989 | Hoffman et al. | 395/90 |
| 4,972,090 | 11/1990 | Eaton | 250/376 X |
| 5,019,764 | 5/1991 | Chang | 318/254 X |

Primary Examiner—Jonathan Wysocki
Attorney, Agent, or Firm—Jordan and Hamburg

[57] ABSTRACT

A compact, accurate, and inexpensive laser beam machine combining the simple structure of a two-dimensional stepping motor and features of laser-beam machining. The machine has a rotating shaft (39) capable of rotating about a vertical axis. The shaft (39) is mounted on a frame (61). A mirror (52) which reflects laser beam emitted from a laser is mounted on the shaft. The stepping motor has a mover (20). A second rotating shaft (34) capable of rotating about a vertical axis is mounted on the mover (20). A mirror (51) which reflects the laser beam, reflected by the mirror (52) toward a workpiece, is mounted on the second shaft (34). The rotating shafts (34, 39) are so driven that if the mover (20) shifts, the laser beam is kept focused to the workpiece by the two reflecting mirrors.

5 Claims, 7 Drawing Sheets

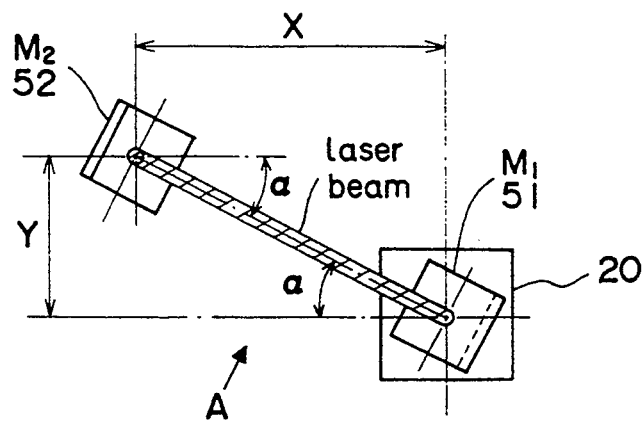
FIG. 5(a)
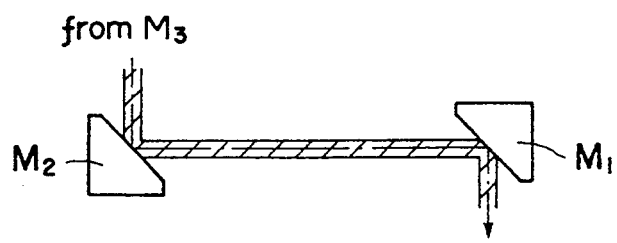
FIG. 5(b)
FIG. 6
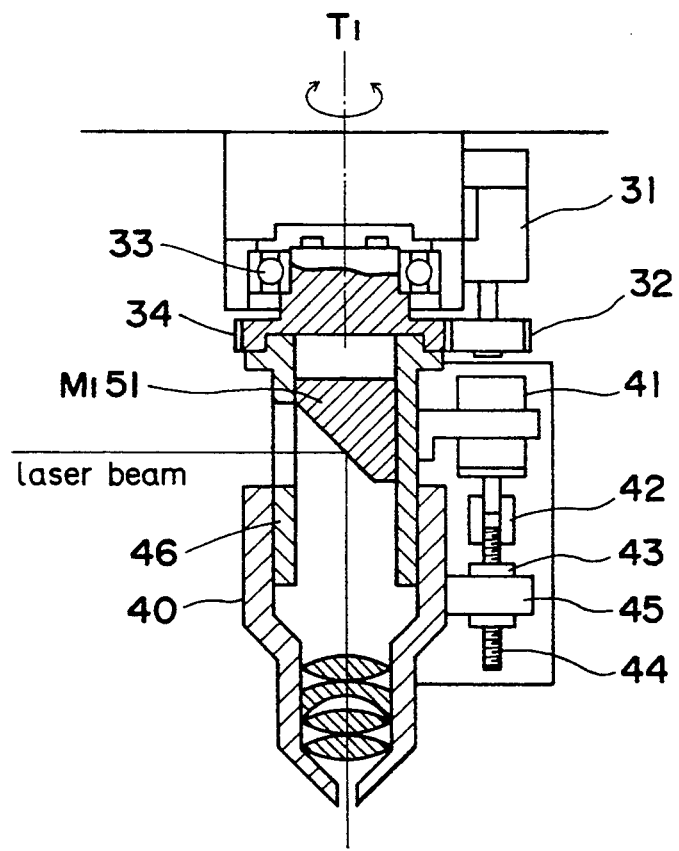

LASER-BEAM MACHINE USING TWO-DIMENSIONAL STEPPING MOTOR

FIELD OF THE INVENTION

The present invention relates to a laser-beam machine using a two-dimensional stepping motor.

BACKGROUND OF THE INVENTION

A robotic system using a two-dimensional linear motor is disclosed in U.S. Pat. No. 4,890,241 to Hoffman et al. as the Automatix's products. This motor stator is mounted to the ceiling of a gate-shaped frame. The robots assembling components are installed under a mover, and are moved under the lower surface of the motor stat or. Furthermore, one kind of two-dimensional stepping motor is disclosed in U.S. Pat. No. 4,823,062 to Hoffman et al.

Here, conventional surface-processing machines using lasers are roughly classified into the three kinds shown in FIGS. 9(a), 9(b) and 9(c). That is, (a) X-axis moving system consists of a conveyor, Y-axis moving system consists of a traverser mounted on a gate, and Z-axis moving system consists of a traverser equipped on said Y-axis traverser.

On Z-axis traverser, a condenser is installed, and the laser-beam is guided to the machining point on a workpiece by a telescopic delivery.

(b) X-Y-Z table system in which a laser is fixed. The workpiece to be machined can be moved in the X-, Y-, and Z-directions.

(c) Turret punch type which is a compromise between the types (a) and (b).

At present, one of the machines (a)-(c) described above are selectively employed according to the size of the workpiece, the required machining accuracy, the kind of the machining operation, and other factors, taking account of the advantages and disadvantages.

Although, relatively, the condenser for focusing a laser beam is essentially lightweight, i.e., 2 to 5 kg, it is necessary to secure the aforementioned machines of high rigidity in order to perform an accurate machining operation. As a result, the machines according to the prior art are considerably large-scale. Recently, higher accuracy is required, and it is necessary to correct the amount of deflection or the mechanical distortion of the coordinate system, depending on the location. This may complicate the control software. In essence, the existing driving system transmits power through complex mechanisms including a servomotor, a ball screw, and various guides. Therefore, it is inevitable that the machine and the driving system are large, complex, and heavy. This has imposed limitations to the response of the servo system. Hence, it has been difficult to improve the existing performance of control further.

SUMMARY OF THE INVENTION

It is an object of the present invention to provide a compact, accurate, and inexpensive laser-beam machine which combines the simple structure of a two-dimensional stepping motor with the features of an laser-beam machine.

The above object is achieved, in accordance with the teachings of the invention, by a laser-beam machine comprising: a two-dimensional stepping motor consisting of a stator extending within a plane and a mover moving within a plane relative to the stator plane; a frame which supports the stator of the two-dimensional stepping motor and on which a workpiece to be machined is set; a laser mounted on the said stator; a first rotating shaft attached to the frame as to be rotatable about an axis perpendicular to the plane on which the mover of the motor moves; an optical system which causes the laser beam emitted by the laser to enter the optical system in the same direction as the direction of the central axis of the first rotating shaft; a first optical means which is mounted on the first rotating shaft and which permits the laser beam entering via the optical system to exit from the first optical means in a direction parallel to the plane in which the mover moves; a second rotating shaft held to the mover as to be rotatable about an axis vertical to the plane in which the mover moves; a second optical means which is mounted on the second rotating shaft, receives the laser beam exiting from the first optical means, and directs the laser beam to the workpiece the frame; and orientation control means for controlling the orientations of the rotating shafts in such a manner that the optical axis of the light exiting from the first optical means agrees with the optical axis of the light incident on the second optical means.

The laser beam emitted from the laser is made to impinge on the first optical means by the optical system. The laser beam exiting from the first optical means is directed toward the second optical means. The second optical means which faces the first optical means receives the laser beam and directs it to the workpiece placed on the frame to machine the workpiece.

Other objects and features of the present invention will appear in the course of the description thereof which follows.

BRIEF DESCRIPTION OF THE DRAWINGS

FIG. 5(a) is a plan view of a mirror arrangement according to the present invention;

FIG. 5(b) is a plan view taken in the direction indicated by the arrow A of FIG. 5(a);

FIG. 6 is a sectional view of a telescopic mechanism for a light condenser;

DETAILED DESCRIPTION OF THE INVENTION

Figure 7:
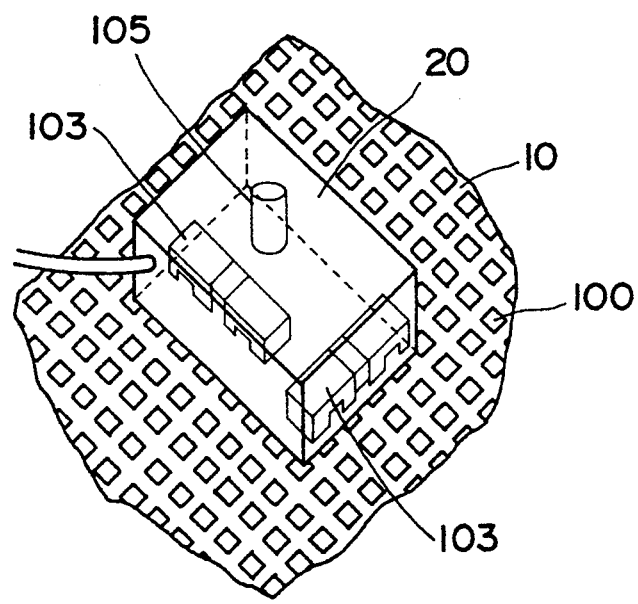
FIG. 7 is a perspective view of a two-dimensional stepping motor.
Figure 8:
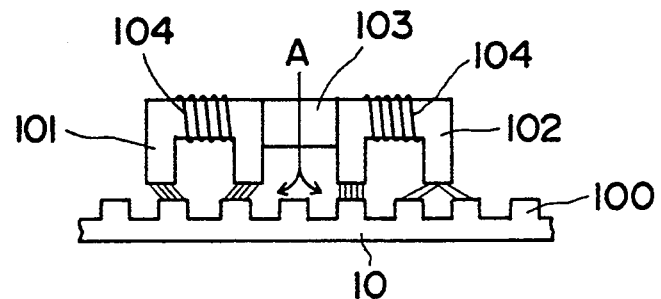
FIG. 8 is a sectional view of a two-dimensional stepping motor.
Figure 9A:
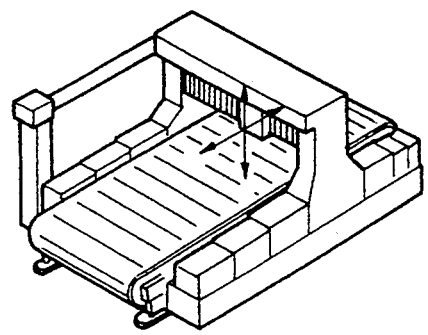
FIGS. 9(a), 9(b) and 9(c) are perspective views of conventional laser-beam machines processing surfaces.
Figure 9B:
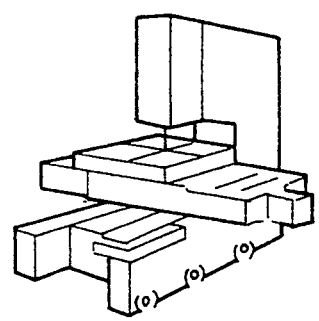
Figure 9C:
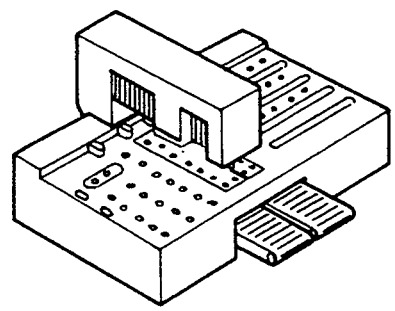

Before describing the preferred embodiments of the invention, a two-dimensional stepping motor is described briefly. As shown in FIGS. 7 and 8, a two-dimensional stepping motor comprises a stator 10 and a mover 20. The stator 10 has magnetic pole pieces 100 arranged in a grid. These magnetic pole pieces 100 are formed by dividing a flat magnetic surface by longitudinal and latitudinal grooves into grids which are spaced an appropriate pitch from each other. The mover 20 comprises two orthogonal U-shaped magnetic pole pieces 101 and 102, exciting coils 104 and a permanent magnet 103 installed between pole pieces 101 and 102. Magnetic legs of magnetized pole pieces 101 and 102 are shifted to half pitch of said pitch with respect to the grids of the stator 10. The mover 20 is held under the stator 10 by the magnetic attraction caused between the pole pieces 101, 102 and the pole pieces 100. By selecting the excitation of the exciting coils 104, the mover 20 moves along the stator surface in any desired direction. To ease the movement of the mover, air is injected between the mover 20 and the stator 10 as indicated by the arrow A to form an air layer.

Since the mover 20 is held below the stator 10 by an attractive force in this way, the stator 10 can be formed as a floor surface, a ceiling surface, or a wall surface. This technique regarding two-dimensional stepping motors is known, as disclosed in U.S. Pat. No. 4,823,062 to Hoffman et al.

Figure 1A:
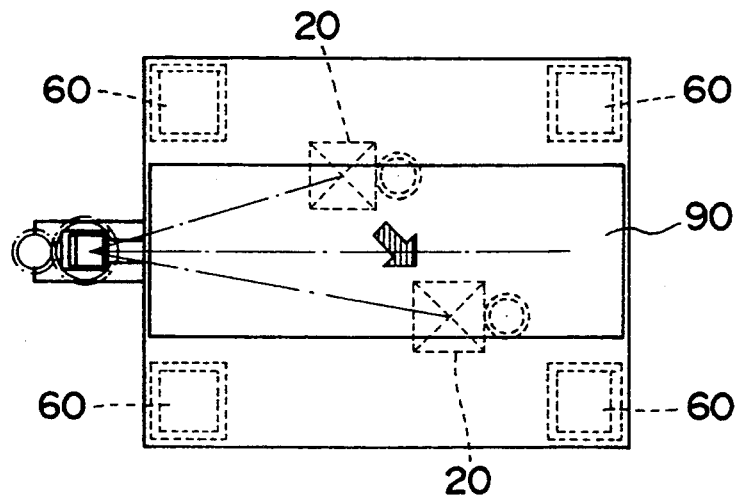
FIG. 1(a) is a plan view of a laser beam machine according to the invention.
Figure 1B:
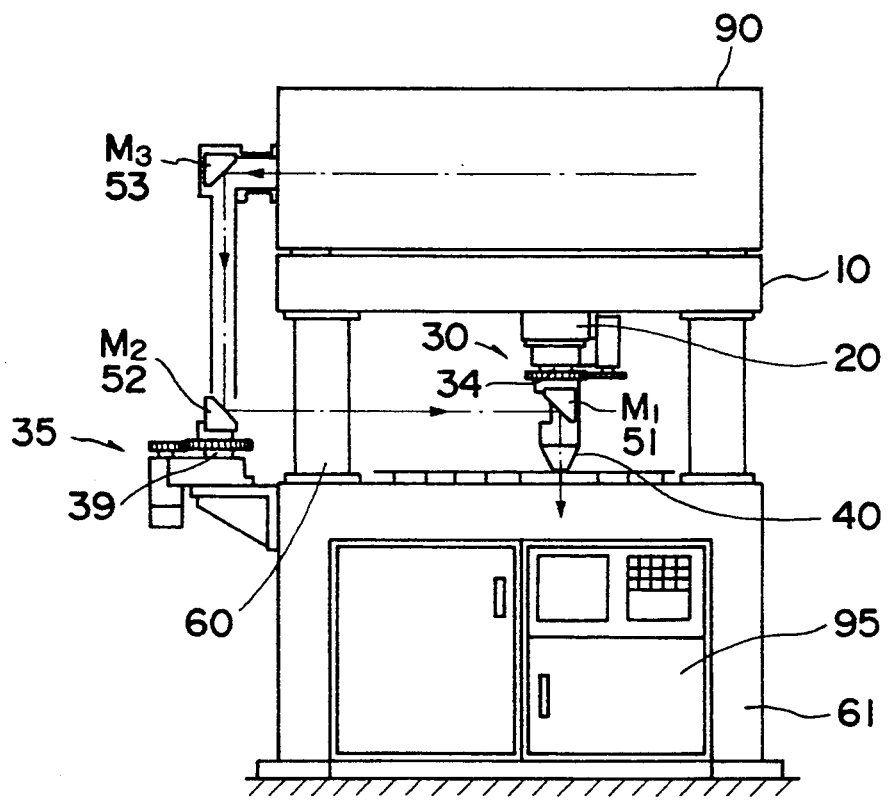
FIG. 1(b) is a front elevation view of the laser beam machine shown in FIG. 1(a)
Figure 2:
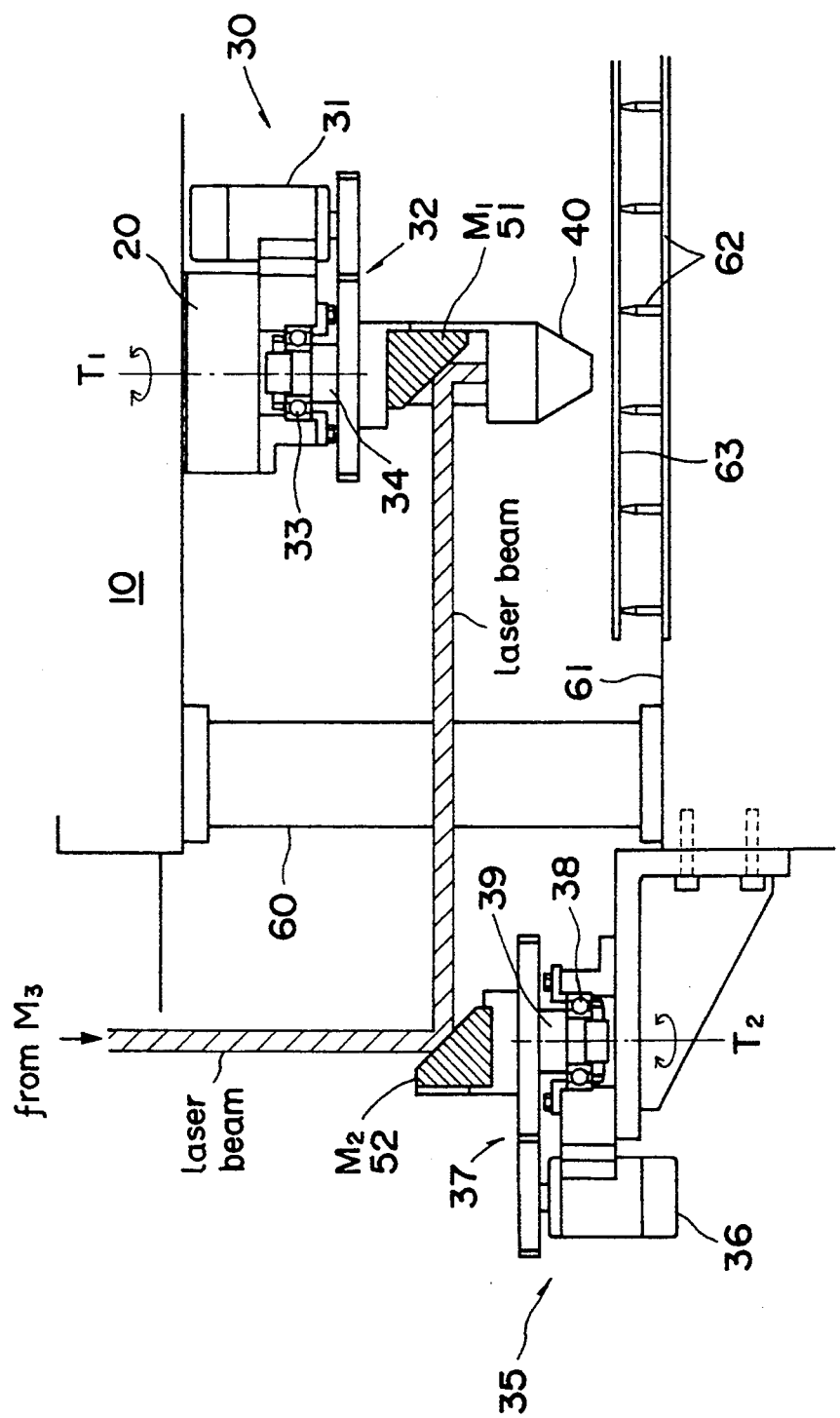
FIG. 2 is an enlarged view of main portions of the laser-beam machine shown in FIGS. 1(a) and 1(b)

Hereafter, a laser-beam machine according to the present invention is described by referring to FIGS. 1(a), 1(b), and 2. FIG. 1(a) and 1(b), show the whole structure of this machine corresponding to claim 2. FIG. 1(a) is a plan view of the machine. FIG. 1(b) is a front elevation view of the machine. A two-dimensional stepping motor stator 10 is rigidly mounted to a frame 61 by four pillars 60. A two-dimensional stepping motor mover 20 comprising a first mirror 51 (M1), a mirror-driving servo device 30, and a light condenser 40 is mounted below the stator 10. A laser 90 mounted on the stator 10 emits a laser beam which is guided to the first mirror 51 via a fixed third mirror 53 (M3) and via a second mirror 52 (M2) that is installed on the servo device 35. The first mirror 51 and the second mirror 52 can rotate about vertical shafts 34 and 39, respectively, and are driven by the servo devices 30 and 35, respectively.

In the machine built as described above, let the angle $\alpha$ be between the first mirror 51 and the second mirror 52 as shown in FIG. 5. The center of rotation of the second mirror 52 is taken as the origin of the coordinate system. Let X and Y be the coordinates of the present position of the center of rotation of the first mirror 51 on the mover 20. The mirror-driving servo devices 30 and 35 are so controlled that the angle $\alpha$ between the first and second mirrors becomes equal to $\tan^{-1}(X/y)$. A control unit 95 is installed in the frame 61.

One specific example of the mirror-driving servo device 30 is shown in FIG. 2. The axis of the rotating shaft 39 is coincident with the optical axis $T_2$ of the laser beam which is emitted from the laser 90 and reflected by the fixed third mirror 53 (FIG. 1). The shaft 39 is rotatably held by a bearing 38. The second mirror 52, for which the reflecting surface is inclined at 45 degrees to a vertical axis, is fixedly mounted to the rotating shaft 39. The shaft 39 is driven via a gear 37 by a driving unit 36 for rotating the optical axis $T_2$. The other rotating shaft 34, having an axis coincident with the vertical axis $T_1$, is rotatably held to the mover 20 of the two-dimensional stepping motor by a bearing 33. The first mirror 51, for which the reflecting surface is inclined at 45 degrees to a vertical axis, is securely mounted to the rotating shaft 34. This shaft 34 is driven via a gear 32 by a driving unit 31 for rotating the optical axis $T_1$. When the mover 20 is moved into a desired position, the control unit 95 controls the driving units 31 and 36 in such a way that the normal to the reflecting surface of the first mirror 51 and the normal to the reflecting surface of the second mirror 52 exist within the same vertical plane.

In the machine described above, the laser beam can be precisely guided to the reflecting surface of the first mirror 51, irrespective of the position of the two-dimensional stepping motor within its movable range. The laser beam can be focused by the light condenser 40 onto a workpiece 63 set on a work support 62 which is on the frame 61.

Figure 3:
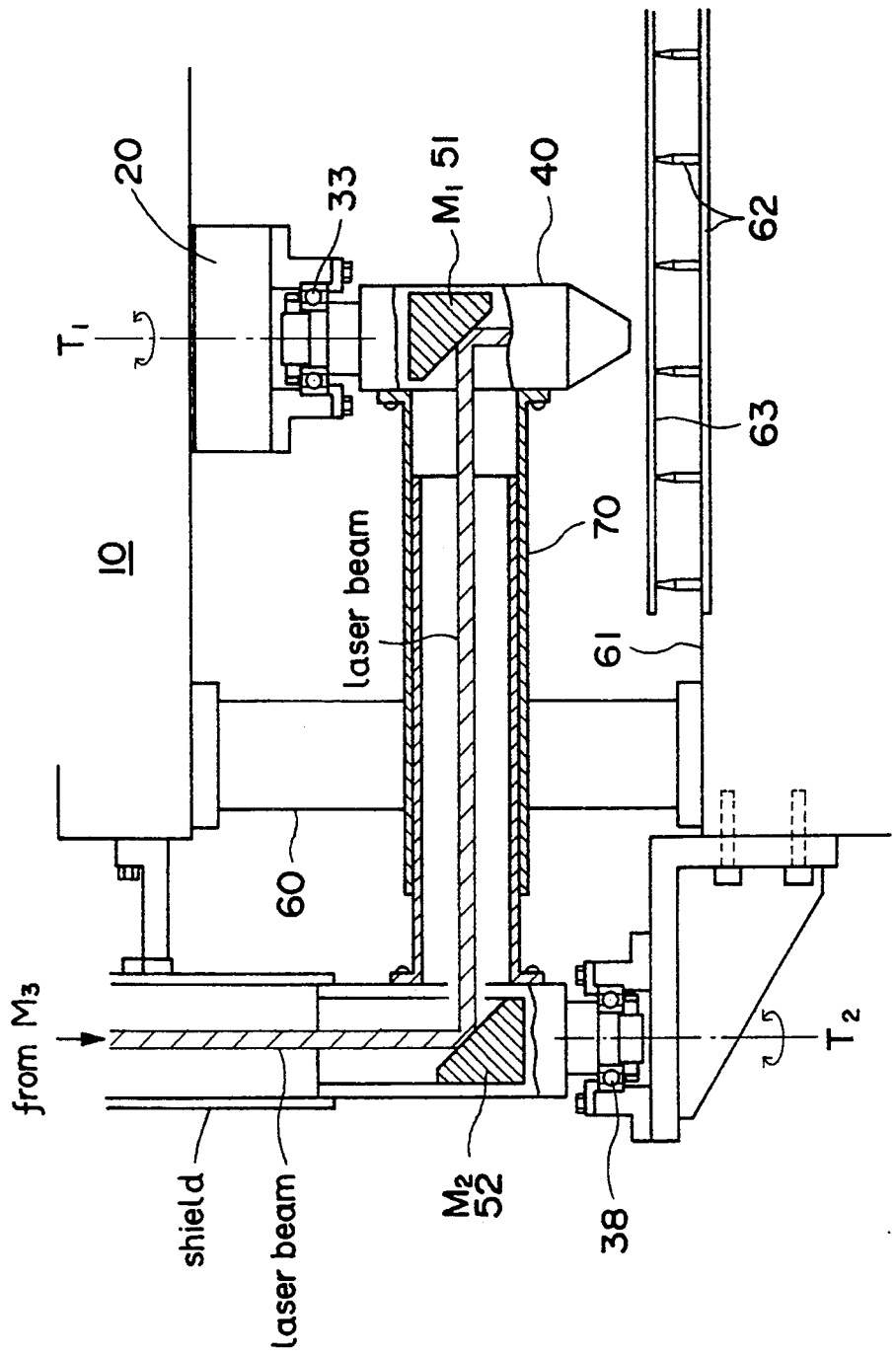
FIG. 3 is an enlarged partially sectioned view of main portions of another embodiment of the laser-beam machine according to the present invention.
Figure 4:
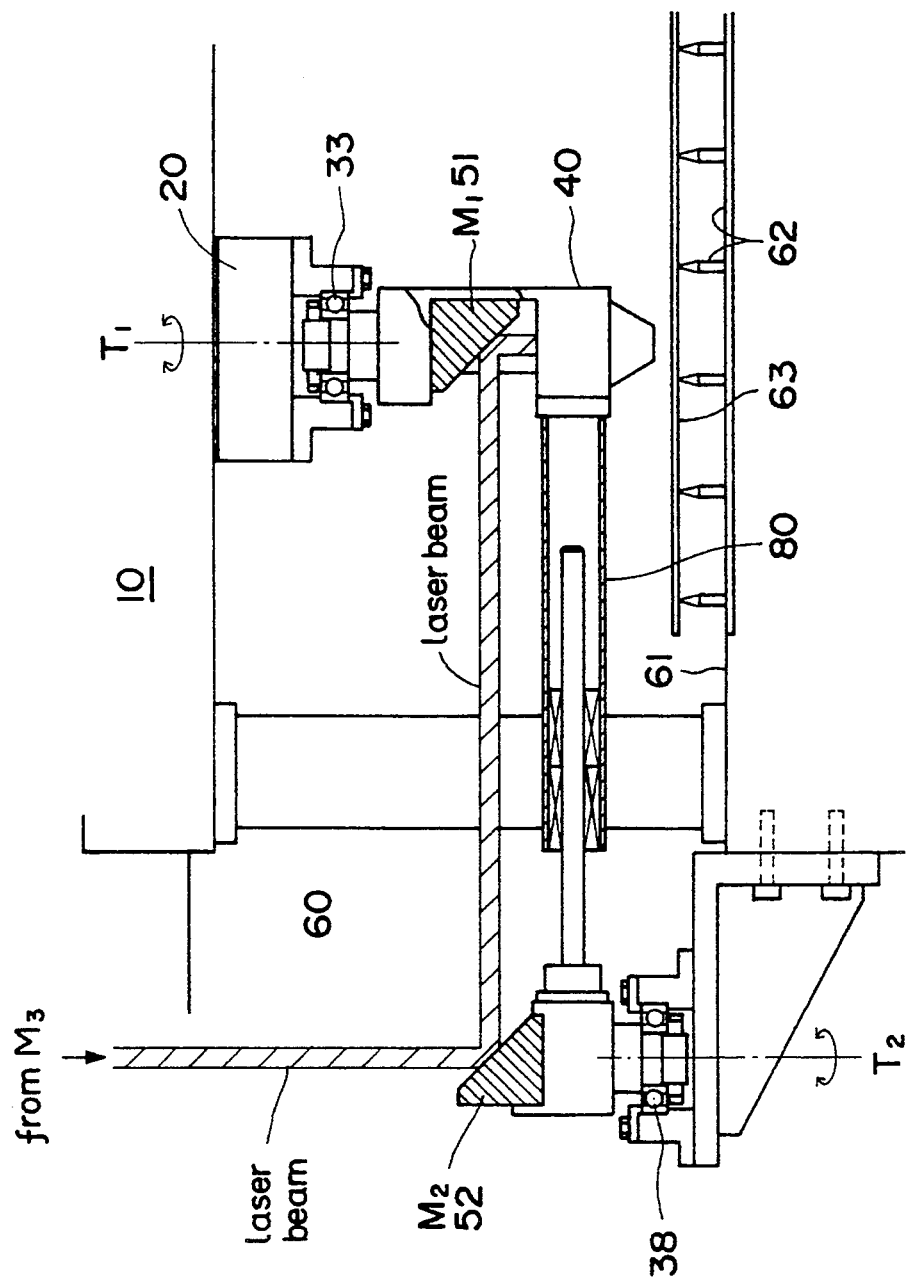
FIG. 4 is an enlarged partially sectioned view of main portions of more another embodiment of the laser-beam machine according to the present invention.

FIGS. 3 and 4 correspond to embodiments corresponding to claims 3 and 4, respectively. In these embodiments, the angle between the first mirror $M_1$ and the second mirror $M_2$ is mechanically controlled instead of using the mirror-driving servo devices 30 and 35 of the embodiment corresponding to claim 2. In FIG. 3, a telescopic delivery 70 enclosing a laser beam is used. In FIG. 4, a telescopic guide 80 not enclosing a laser beam is employed.

FIG. 6 corresponds to an embodiment corresponding to claim 5. In this embodiment, a guide tube 46, having an axis coincident with the vertical axis $T_1$, is installed below the rotating shaft 34. The first mirror 51 ($M_1$), for which the reflecting surface is inclined at 45 degrees to a vertical axis, is installed in the guide tube 46. The light condenser 40, having a bore slidably fitted to the guide tube 46, is fitted to the periphery of the guide tube 46. A nut holder 45, holding the screw nut 43, is installed on the periphery of the light condenser 40. A screw shaft 44, coupling to the driving unit 41 with a coupling device 42, is rotatably fitted to the screw nut 43. Therefore, when the screw shaft 44 is rotated by driving unit 41, the light condenser 40 is telescoped on the vertical axis with guidance of the guide tube 46.

The present invention can offer a compact, accurate, and inexpensive laser-beam machine to machine workpieces notable because of its relatively small size. Also, it is easy to install a laser or the like in the space existing on the stator because of a particular feature of the structure of the two-dimensional stepping motor. The optical system for guiding the beam can be simplified. Furthermore, the space in which the machine is installed can be reduced to a minimum. The dead space between the movable head of the two-dimensional stepping motor and the outer surface of the stator is small. Therefore, in the case of a $CO_2$ laser, a beam shield such as a plate of glass can be easily and efficiently mounted outside the stator. Hence, safety can be efficiently secured. Another feature of the two-dimensional stepping motor is that a plurality of mover can be operated on one stator. Therefore, plural machining heads equipped with the optical system described above can be operated in the same space. This leads to a reduction in the machining time and such improvements of machining quality as homogeneity in thermal distortion.

What is claimed is:

1. A laser-beam machine using a two-dimensional stepping motor comprising:
   said two-dimensional stepping motor consisting of a stator extending within a plane and a mover that is moved within a plane relative to the stator;
   a frame which supports the stator of the two-dimensional stepping motor and on which a workpiece to be machined is set;
   a laser mounted on said stator;

a first rotating shaft held to the frame in such a way as to be rotatable about an axis perpendicular to the plane on which the mover of the motor moves;

an optical system which causes the laser beam emitted by the laser to enter the optical system in the same direction as the direction of the central axis of the first rotating shaft;

a first optical means which is mounted on the first rotating shaft and which permits the laser beam entering via the optical system to exit from the first optical means in a direction parallel to the plane on which the mover moves;

a second rotating shaft held to the mover in such a way as to be rotatable about an axis perpendicular to the plane in which the mover moves;

a second optical means which is mounted on the second rotating shaft, receives the laser beam exiting from the first optical means, and directs the laser beam to the workpiece that is on the frame; and orientation control means for controlling the orientations of the rotating shafts in such a manner that the optical axis of the light exiting from the first optical means agrees with the optical axis of the light incident on the second optical means.

2. The laser-beam machine using two-dimensional stepping motor as in claim 1, wherein said orientation control means are servo devices which controllably rotate the first and second rotating shafts, respectively, according to the position of the mover.

3. The laser-beam machine using two-dimensional stepping motor as in claim 1, wherein said orientation control means comprises a tube which is connected between the first and second optical means, capable of stretching and contracting in the longitudinal direction, and rigid against bending force.

4. The laser-beam machine using two-dimensional stepping motor as in claim 1, wherein said orientation control means comprises a telescopically constructed guide which is connected between the first and second optical means, capable of stretching and contracting in the longitudinal direction, and rigid against bending force.

5. The laser-beam machine using two-dimensional stepping motor as in claim 1 to 4, wherein said orientation control means comprises a telescopically constructed guide which is installed in the first optical means, capable of stretching and contracting in the vertical direction.

* * * * *